United States Patent

Menzel et al.

[11] Patent Number: 5,574,204
[45] Date of Patent: Nov. 12, 1996

[54] METHOD FOR THE MUTUAL CHEMICAL AND COMPACTION TREATMENT OF INORGANIC WASTES

[75] Inventors: Thomas Menzel, Hilden; Joachim Beyer, Kürten; Gerd Bauer, Leverkusen; Bernd Koglin, Bergisch Gladbach; Rolf Rink, Cologne, all of Germany

[73] Assignee: Bayer Aktiengesellschaft, Leverkusen, Germany

[21] Appl. No.: 446,793

[22] PCT Filed: Nov. 19, 1993

[86] PCT No.: PCT/EP93/03240

§ 371 Date: Jul. 24, 1995

§ 102(e) Date: Jul. 24, 1995

[87] PCT Pub. No.: WO94/12292

PCT Pub. Date: Jun. 9, 1994

[30] Foreign Application Priority Data

Dec. 3, 1992 [DE] Germany ............... 42 40 589.0

[51] Int. Cl.⁶ .................................................. B09B 3/00
[52] U.S. Cl. .................... 588/252; 588/256; 588/260; 405/128
[58] Field of Search ................... 405/128, 129; 588/252, 256, 260

[56] References Cited

U.S. PATENT DOCUMENTS

| | | | |
|---|---|---|---|
| 3,837,872 | 9/1974 | Conner . | |
| 3,893,656 | 7/1975 | Opacic et al. . | |
| 4,028,130 | 6/1977 | Webster et al. | 588/252 |
| 4,342,732 | 8/1982 | Smith | 405/128 X |
| 4,456,400 | 6/1984 | Heide et al. | 405/128 |
| 4,886,393 | 12/1989 | Jahn-Held et al. | 405/128 |
| 5,090,843 | 2/1992 | Grigsby et al. | 405/129 |
| 5,193,936 | 3/1993 | Pal et al. | 405/128 |
| 5,367,116 | 11/1994 | Frey | 588/252 |

FOREIGN PATENT DOCUMENTS

| | | |
|---|---|---|
| 0050371 | 4/1982 | European Pat. Off. . |
| 0230913 | 8/1987 | European Pat. Off. . |
| 2012786 | 10/1971 | Germany . |
| 2628656 | 4/1984 | Germany . |
| 3842215 | 6/1990 | Germany . |
| 4022913 | 4/1991 | Germany . |
| 2217314 | 10/1989 | United Kingdom . |
| 8902294 | 3/1989 | WIPO . |

OTHER PUBLICATIONS

Akhter, H. et al. *Journal of Hazardous Materials*, 1990, pp. 145–155.
H. U. Wiedemann, Chem.-Ing.-Tech., vol. 56, No. 1, pp. 55–56, (1984).
M. Stammler, et al., Chem.-Ing.-Tech., vol. 59, No. 5, pp. 393–396, (1987).
B. Koglin, et al., Chem.-Ing.-Tech., vol. 63, No. 6, pp. 605–607, (1991).
V. G. Diderich, et al., VGB Kraftwerkstechnik, vol. 69, No. 11, pp. 1132–1141, (1989).

Primary Examiner—George A. Suchfield
Attorney, Agent, or Firm—Sprung Horn Kramer & Woods

[57] ABSTRACT

Water-containing inorganic waste materials, originally in loose form, and which contain water-soluble components capable of reacting with each other are mixed and then compacted at a pressure sufficient to reduce the space volume between the particles of material, cause the reduced space volume to become filled with water and the reactive components to react.

7 Claims, 3 Drawing Sheets

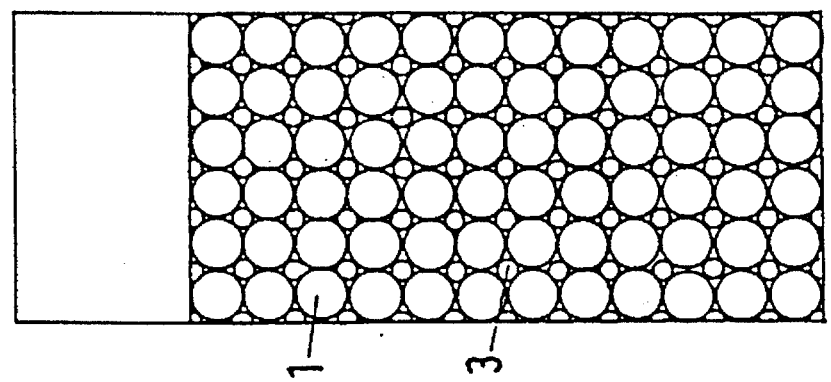
Fig.3
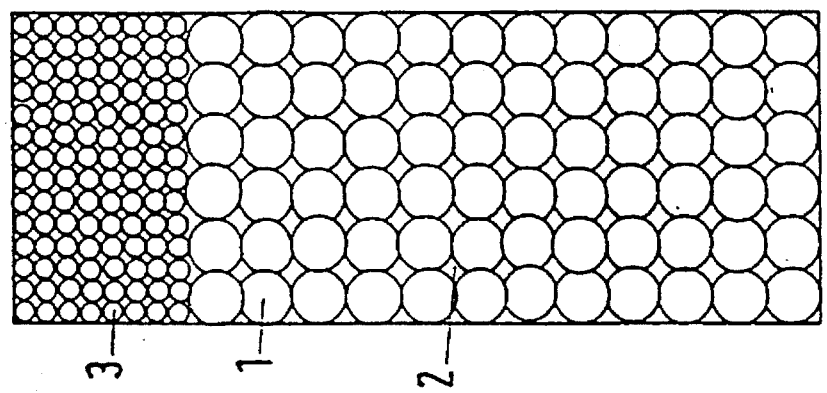

METHOD FOR THE MUTUAL CHEMICAL AND COMPACTION TREATMENT OF INORGANIC WASTES

The invention relates to a method for the mutual chemical treatment and compaction of inorganic waste materials intended for disposal by deposition, in which the waste materials are in loose form and are compacted by applying high pressures.

BACKGROUND OF THE INVENTION

In prior art methods for the chemical treatment and compaction of inorganic waste materials high quantities of water are added and high quantities of binder are required. In such methods the reaction mixture usually has the consistency of a pumpable mixture. Due to the use of the high quantities of additives these methods have the disadvantage of a large increase in the volume of waste.

One prior art method for the physical treatment and compaction of inorganic waste materials comprises compacting the waste under pressure. The inorganic waste materials are mixed with each other in accordance with appropriate specifications and compressed at high pressures to form solid compacts. Due to the low permeability of the slabs their elutability is reduced. These waste slabs are transported to the disposal site and placed in the disposal unit in modular form. Although this method has the advantage over the abovementioned methods of saving space in the disposal unit the compacts are not dimensionally stable under water and their constituents can be reeluted after prolonged exposure to water.

The prior art is further described in the following literature references

Literature (1) U.S. Pat. No. 3,837,872
(2) U.S. Pat. No. 3,893,656
(3) EP PS No. 0,189,062
(4) Stammler, M.; Hass, H. J.;
  Methoden zur Immobilisierung von Bodenkontaminationen ("Methods for immobilising soil contamination") Chem.-Ing.-Tech., 59, 1987, 393
(5) Wiedemann, H. U.;
  Verfestigung von Sonderabfällen ("Compaction of hazardous wastes") Chem.-Ing.-Tech., 56, 1984, 55
(6) Knieper, J.; Printz, H.; May, K.; KFA Jülich
  Verfestigungsverfahren ("Compaction processes") Technische Inf., 30
(7) DE 34 26 800 C2,
(8) Diderich, G.; Kirpach, C.; Kirsch, N.; Schmit, R.; Wagner A.;
  Verfestigung von Rückständen aus einer luxemburgischen Müllverbrennungsanlage ("The compaction of residues from a refuse incineration plant in Luxembourg") VGB Kraftwerkstechnick, 69, 1989, 1132
(9) Hülier, R.; Dietl, R.;
  Aufbereitung und Entsorgung von Kraftwerksreststoffen ("The processing and disposal of residuals from power stations") Techn. Mitt., 78, 1985, 58 and
(10) Sprung, S.; Rechenberg, W.;
  Einbindung von Schwermetallen in Sekundärstoffen durch Verfestigen mit Zement ("The fixation of heavy metals in secondary materials by compaction with cement") Beton 38, 1988, 193–198
(11) Akhter, H.; Butler, L. G.; Branz, S.; Cartledge F. K.; Tittlebaum, M. E.;
  Immobilization of As, Cd, Cr and PB-containing Soils by using Cement or Pozzolanic Fixing Agents J. Hazard. Mat., 24, 1990, 145
(12) The Stabilization Game
  Env. Sci. & Technol., 9, 1975, 622
(13) Weitzmann, L.;
  Factors for Selecting Appropriate Soldification/Stabilization Methods J. Hazard. Mat., 24, 1990, 157
(14) DE OS No. 38 42 215
(15) Koglin, B.; Beyer, J.; Ring, R.; Roth, J.-E.;
  Hochdruck-Verdichtung und Einbau von Abfällen, ein Systembestandteil der Bayer Kompakt-Deponie ("The high-pressure compaction and deposition of waste materials, as part of the system employed in the Bayer Compact Disposal Process") Chem.-Ing.-Tech., 63, 1991, 605
(16) Deutsche Einheitsvorschrift zur Wasser-, Abwasser und Schlammuntersuchung
  ("German Standard for the examination of water, waste water and sludge") Schlamm und Sedimente (Gruppe S) DIN 38 414

Based on the above prior art a method has been developed in which the advantages of the abovementioned methods of chemical treatment and compaction are combined with those of the abovementioned physical treatment methods.

SUMMARY OF THE INVENTION

The new method is characterised according to the invention in that various water-containing inorganic waste materials intended for disposal by deposition, which contain water-soluble components capable of reacting chemically with one another, are mixed together and compacted under such a high pressure that the pore volume of the loose material mixture is reduced essentially to the liquid volume resulting from the moisture in the loose material of the waste mixture, so that the pores between the particles of loose material are filled completely or almost completely with liquid. As a result, chemical reactions take place between the reactive components dissolved in the liquid phases of the components of the mixture and the reactive constituents contained in the particles of loose material, as a result of which the toxic substances contained in the waste materials are completely or partially converted into materials which are less damaging to the environment by precipitation, neutralisation and redox reactions.

In one variant of the method according to the invention the toxic substances are converted into sparingly soluble compounds during the conversion process and are thereby immobilised.

According to a further development the pressure required for the complete filling of the pores is determined by measuring the onset of dehydration during compaction and the compactor is controlled with the aid of this measured signal.

The compacting pressure is advantageously in the range from 20 bars to 5,000 bars, and preferably in the range from 80 bars to 400 bars.

The residual moisture of the mixture of waste material to be compacted is appropriately between 3% by weight and 50% by weight and preferably between 10% by weight and 30% by weight and can if necessary be adjusted to a value within these ranges by adding water or dry auxiliaries.

In order to improve the consolidation during compaction 2% by weight to 50% by weight, preferably 5% by weight to 30% by weight, of binders can be added to the waste materials. Customary binders are for example cement, sodium silicate, pozzolana, etc.

According to a preferred variant, waste materials in the form of loose materials with varying particle sizes are mixed with one another in such a manner that the particles of the finer loose material fraction fill the pores of the coarser loose material fraction, as a result of which the pore volume of the waste material mixture to be compacted is reduced and a smaller quantity of liquid is necessary to fill the pores. For this purpose it is merely necessary to choose the correct mixing ratio.

Thus in the new method inorganic compactible waste materials in loose form are mixed systematically with one another according to their chemical constituents, their particle size distribution and their moisture content so as to make use of chemical reactions between reactive components of the waste materials. The reactive potential of the waste materials is thus deliberately exploited in order to carry out chemical reactions which would otherwise have to be carried out in separate process steps with the aid of treatment chemicals. As a rule inorganic waste materials intended for disposal by deposition always have a certain degree of residual moisture (water content). On compaction, the voids (pores) between the particles of loose material are greatly reduced in volume, as a result of which the liquid resulting from the residual moisture collects in the pores and almost completely fills the latter. The liquid in the pores then serves as a reaction medium for chemical reactions between the reactive components of the waste materials. During compaction coherent solid compacts are formed which are dimensionally stable under water and have high mechanical stability and low elutability.

The residual moisture of the waste material mixture can be specifically adjusted by mixing the waste materials. It is thus possible to almost completely dispense with the addition of water. Compaction also considerably reduces the volume of waste material, which produces an additional saving in space in the disposal unit.

In summary the method provides the following advantages for improving the environmental compatibility of waste disposal sites:

- the elution of toxic substances from waste materials is reduced by chemical conversion and immobilisation,
- as opposed to the prior art methods for depositing waste materials, uncontrollable chemical reactions are prevented in the disposal unit,
- the elution of toxic substances from waste materials is reduced by compaction,
- the quantity of treatment chemicals is reduced compared with prior art methods,
- the addition of water is almost completely dispensed with,
- the volume of disposal space required is reduced compared with prior art methods,
- stackable blocks which can be systematically placed in the disposal unit are produced.

In the following the invention is described in more detail by means of practical examples and drawings.

BRIEF DESCRIPTION OF THE DRAWINGS

FIG. 3 depicts diagrammatically the reduction in pore volume by mixing moist loose materials (waste materials) of varying particle sizes.

FIG. 1 depicts diagrammatically the decrease in the pore volume of a mixture of moist waste materials as the pressure increases. The voids (pores) 2 partially filled with water are located between the loose material particles 1. If the ratio of the void volume to the total volume (porosity) is defined as $\epsilon$, the solid volume is 1-$\epsilon$. Whereas the solid volume remains constant, the void volume accordingly decreases as the pressure increases. The waste material mixture is depicted at a pressure of 3 bars as the starting basis for the reduction in volume. Such compaction is at best achieved with the otherwise commonly used compacting processes such as vibration or tamping. A pressure of 150 bars is sufficient to reduce the pore volume to a third (from 45% to 15% of the starting volume at 3 bars). Thus if a third of the pore space is originally filled with liquid and two-thirds thereof with air a pressure of 150 bars is necessary to obtain the complete filling of the pores with liquid and thus to trigger off and carry out the chemical reaction between the waste material components/auxiliaries. The complete filling of the pores with liquid can be determined by the onset of dehydration. This can be detected analytically by the sudden increase in electrical conductivity as a result of the escape of pore liquid.

FIG. 2 depicts the path of the total volume and the pore volume of a similar waste material mixture, as a function of the pressure. In addition the diagram shows the increase in strength of a compact as the pressure increases and the decrease in the permeability thereof as the pressure increases.

Figure 1:
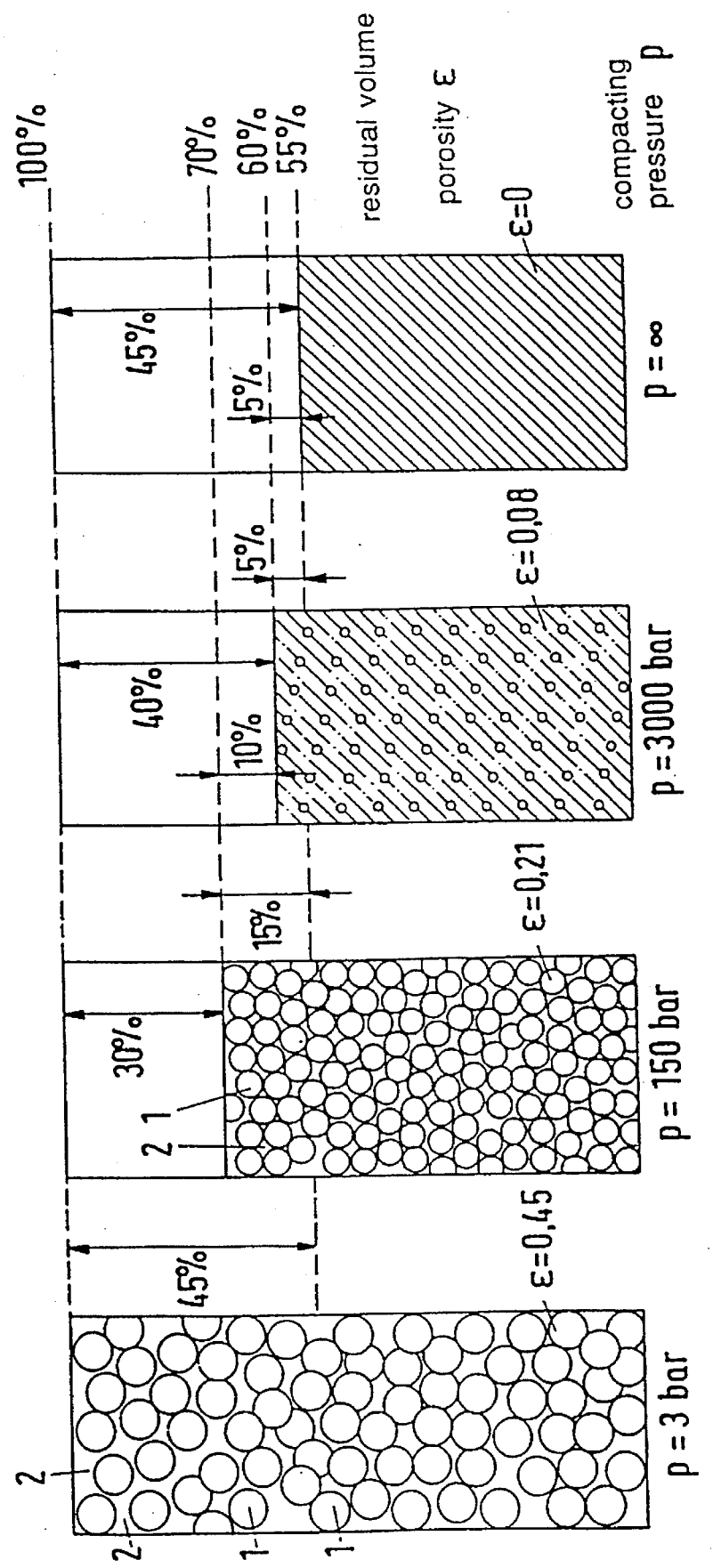
FIG. 1 depicts diagrammatically the reduction in volume obtained on compacting moist loose waste materials.
Figure 2:
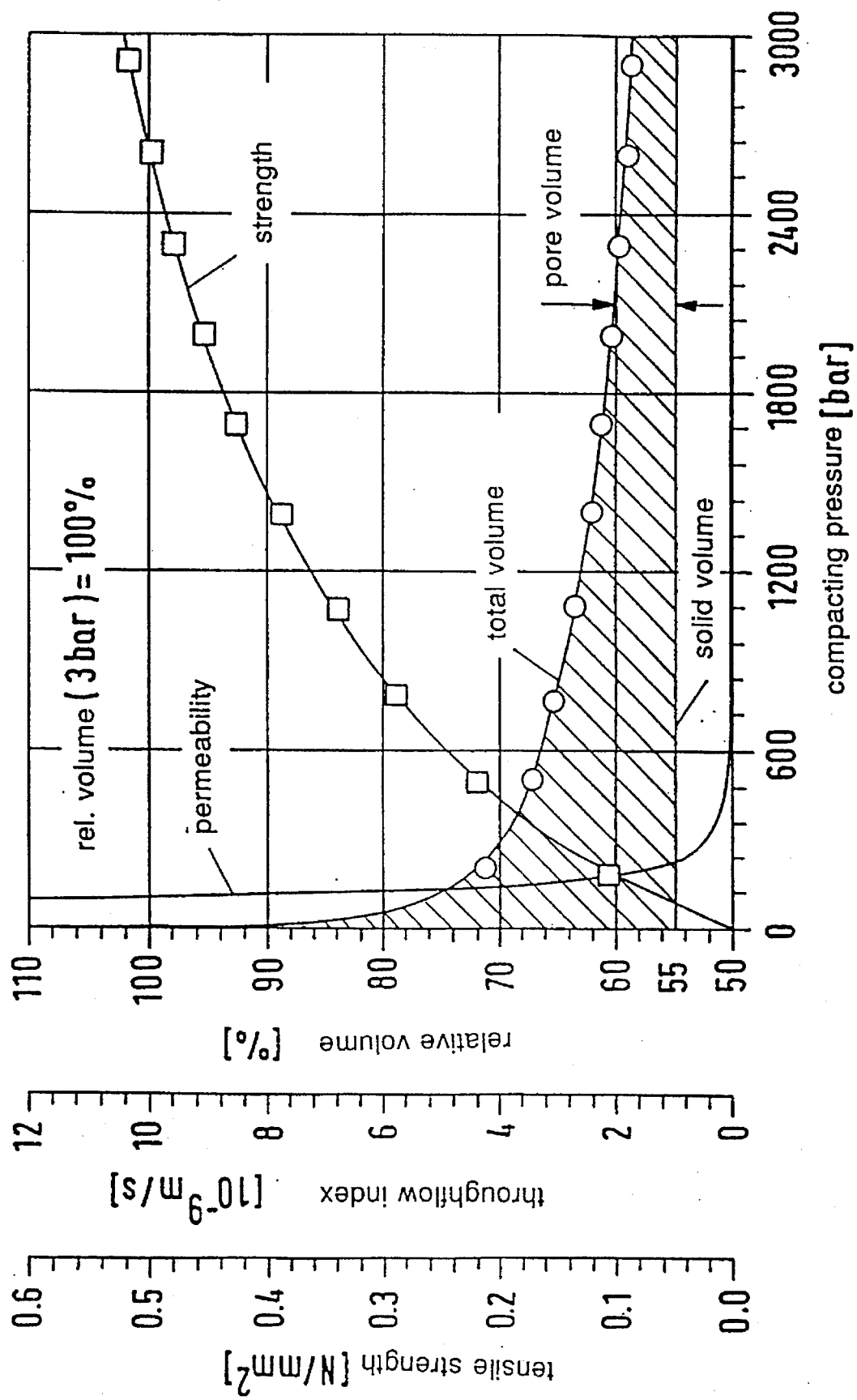
FIG. 2 depicts the total volume, the pore volume and the solid volume of a moist loose material as well as the permeability and the strength of the compacted blocks as a function of the compacting pressure

If waste materials with particles of varying sizes are selected systematically in the waste material mixture, the pore volume can be reduced from the outset. As FIG. 3 shows, the pores can be saturated with liquid even at lower pressures. In this figure the smaller solid particles are labelled with the number 3.

PRACTICAL EXAMPLES

Example 1

A mixture of waste materials consisting of 25% of waste material A (the most important components of the waste materials are summarised in Table 1), 50% of waste material B and 15% of waste material C as well as auxiliaries consisting of 5% of sodium silicate and 5% of calcium chloride, is compacted at a pressure of 140 bars. The residual moisture of the mixture is about 15% by weight. The modular compact which is dimensionally stable under water displays S4 analytical results of $Cu^{2+}$<0.1 mg/l, (r VI)<0.1 mg/l, sulphate 1081 mg/l and a water-solubility of 5.0%. The Cr (VI) of the waste material B is reduced by the Fe (II) contained in waste material C, whereas the sulphate of the water-soluble iron and sodium sulphates is precipitated in the form of gypsum due to the excess of $Ca^{2+}$ in waste material A and the calcium chloride, and the $Cu^{2+}$ from the water-soluble copper sulphate of waste material C is precipitated in the form of copper hydroxide due to the alkaline pH value of the waste material A. At the same time the water-solubility of the waste material decreases as a result of the precipitation reactions.

Example 2

60% of the waste material A with its high $Ca^{2+}$ excess are mixed with of 30% waste material D and 10% of portland cement in order to treat the water-soluble sulphate in waste material D and the mixture is compacted at 200 bars. The residual moisture of the mixture is about 14%. According to S 4 the modular compact which is dimensionally stable under water displays a sulphate eluate value of 293 mg/l and a water-solubility of 2.1%.

TABLE 1

Important constituents of waste materials A–D

| Waste material | Constituents |
| --- | --- |
| A | 30% calcium hydroxide, 12% iron(III) oxide, 10% silicon dioxide, 20% aluminium oxide, 5% magnesium oxide, 8% gypsum and 15% water |
| B | 36% iron(III) oxide, 18% aluminium oxide, 10% magnesium oxide, 10% chromium(III) oxide, 2% silicon dioxide, 7.5% sodium sulphate, 0.5% sodium dichromate and 16% water |
| C | 59.8% silicon dioxide, 21% iron(II) sulphate, 4% sulphuric acid, 0.2% copper sulphate and 15% water |
| D | 63% gypsum, 17% sodium sulphate, 3% sodium chloride and 17% water |

We claim:

1. A method for the mutual chemical treatment and compaction of inorganic waste materials, which are in loose particulate form and contain water and also contain water-soluble components capable of reacting with one another, which comprises mixing said waste materials together, then compacting them under a pressure sufficient to reduce the pore volume between the individual particles to the liquid volume resulting from the water in the waste materials, so that the pores between the particles of loose material are partially or completely filled with a water solution of reactive components and chemical reactions take place between the reactive components.

2. Method according to claim 1, wherein the reactive components are converted into sparingly soluble compounds during the process and are thereby immobilized.

3. Method according to claim 1, wherein the pressure required for the complete filling of the pores is determined by measuring the onset of dehydration during compaction and the pressure is controlled with the aid of this measurement.

4. Method according to claim 1, wherein the compacting pressure is in the range of from 20 bars to 5,000 bars.

5. Method according to claim 1, wherein the water content of the waste material mixture prior to compaction, is between 3% by weight and 50% by weight and is adjusted to a value within these ranges, optionally by adding water or dry auxiliaries.

6. Method according to claim 1, wherein 2% by weight to 50% by weight of binders are added for the additional consolidation of the waste materials.

7. Method according to claim 1, wherein loose materials of varying particle sizes are mixed with one another in such a mixing ratio that the particles of the finer loose material fraction completely fill the pores of the coarser loose material fraction, as a result of which the pore volume of the waste material mixture to be compacted is reduced and a smaller quantity of liquid is necessary to fill the pores.

* * * * *